United States Patent [19]

Goshima

[11] 3,902,010

[45] Aug. 26, 1975

[54] INFORMATION RECORDING DEVICE WITH RECORD HAVING LAYERS WITH DIFFERENT INTENSITY SENSITIVITY

[75] Inventor: Takeshi Goshima, Tokyo, Japan

[73] Assignee: Canon Kabushiki Kaisha, Tokyo, Japan

[22] Filed: Feb. 14, 1973

[21] Appl. No.: 332,482

[30] Foreign Application Priority Data

Feb. 15, 1972 Japan ................................ 47-15888
June 2, 1972 Japan ................................ 47-54947

[52] U.S. Cl...... 178/6.7 A; 178/6.6 R; 179/100.3 V; 179/100.4 C; 346/108

[51] Int. Cl.$^{2}$.. H04N 5/84; G11B 11/12; G11B 3/80

[58] Field of Search ............... 179/100.3 A, 100.3 V, 100.3 B, 179/100.3 K, 100.41 L, 100.4 C; 178/6.7 A, 6.7 R, 6.6 R, 6.6 TP; 346/108; 340/173 LM; 274/42 R

[56] References Cited

UNITED STATES PATENTS

| | | | |
|---|---|---|---|
| 2,477,640 | 8/1949 | Montague | 179/100.3 A |
| 3,281,151 | 10/1966 | Kuprelian et al. | 179/100.3 B |
| 3,407,272 | 10/1968 | Barocela | 179/100.3 K |
| 3,438,050 | 4/1969 | Ashenbrenner et al. | 346/108 |
| 3,513,268 | 5/1970 | John | 179/100.3 K |
| 3,654,401 | 4/1972 | Dickopp et al. | 179/100.3 V |
| 3,737,589 | 6/1973 | Redlich et al. | 179/100.3 A |

OTHER PUBLICATIONS

An Experimental Television Recording and Playback System Using Photographic Discs, Rice, et al., JSMPTE, Vol. 79, No. 11, pp. 997–1002, 11/70, (178–6.7A).

*Primary Examiner*—Raymond F. Cardillo, Jr.
*Attorney, Agent, or Firm*—Fitzpatrick, Cella, Harper & Scinto

[57] ABSTRACT

An information recording device includes a recording medium having a substrate, a first photosensitive layer of a first photosensitivity formed over one surface of the substrate, and a second photosensitive layer of a second photosensitivity provided over said first photosensitive layer. Beams are provided to scan the photosensitive layers of the recording medium with a light beam modulated by information signals and a steady light beam independent of the signals. One of the photosensitive layers is responsive to the modulated beam and a particular one of the photosensitive layers is responsive to the steady beam.

10 Claims, 15 Drawing Figures

(A) (B)

INFORMATION RECORDING DEVICE WITH RECORD HAVING LAYERS WITH DIFFERENT INTENSITY SENSITIVITY

BACKGROUND OF THE INVENTION

1. Field of the Invention

This invention relates to an information recording device, and particularly to such a device in which light modulated by information signals is used to record information signals on a recording medium.

2. Description of the Prior Art

The most widely known device for recording high-frequency information signals such as television signals is the magnetic recording device such as magnetic tape or magnetic disc device. In such magnetic recording device, a magnetic member and a recording element are moved relative to each other so that the magnetic member is magnetized in accordance with information signals along the path of the recording element.

A recording device known as video disc recorder (VDR) has recently been proposed which employs no such magnetic means. Like the conventional disc-shaped recording medium used for the audio recording, the recording medium employed by the VDR is in the form of a disc having thereon a spiral formation of V-sectioned grooves whose opposite sides are provided with concavities and convexities arranged in a wave form. To derive information signals from such recording medium, a piezoelectric element is fixed to a detector for tracing said grooves, whereby signals corresponding to the concavities and convexities provided on the two sides of the grooves may be derived by the piezoelectric element.

To impress information on the opposite sides of the V-shaped grooves, the recording medium must be subjected to mechanical cutting procedures as in the production of conventional audio record discs. This is time-consuming and requires the provision of some special additional means.

Generally, the reproduction frequency of a video signal is in a wide range having the upper limit of several megahertz, and on the other hand, the upper limit of the frequency of the mechanical vibrations provided by the device for machining the record press prototype is only several tens of kilohertz. In order to prepare a video record prototype by the use of the above-described mechanical cutting process, it has therefore been the practice to reproduce video signals from a video signal source such as VDR, record the electrical signals once on a length of photographic film, and reproduce such film by means of a flying spot scanner or the like at a speed matching the machining speed of the cutter for the record prototype while subjecting the prototype to a cutting procedure, thus providing a complete prototype.

Since the reproduction speed of the video signals is thus reduced down to the upper limit of the machining speed, the entire machining time required has been as long as about one hundred times the reproduction time required for the video signals.

Such a long time required for the production of a record prototype has been a very serious disadvantage in providing video records rapidly and inexpensively on a mass production scale.

Moreover, the prior art system has a demerit in that video signals do not directly control the cutter but the signals are recorded by way of photographic film, flying spot scanner, etc., thus resulting in deterioration of the video signals themselves.

Furthermore, any guide section for spirally guiding the detector along the grooves is not provided but that side of the groove on which information has been recorded serves also as the guide section and such construction has led to an inconvenience that the force needed to guide the pick-up means would act directly on that side of the groove to make accurate reproduction of the signals quite difficult.

In addition, the recording has been carried out by converting electrical signals into a mechanical movement of the cutter, with a result that the recorded signals cannot always be of satisfactory quality.

SUMMARY OF THE INVENTION

It is an object of the present invention to eliminate the above-described disadvantages peculiar to the prior art and provide an information recording device in which light is modulated by information signals and the modulated light is used to record information signals on a recording medium without resorting to any mechanical means.

It is another object of the present invention to provide an information recording device which is capable of recording information on a recording medium at a high speed.

It is still another object of the present invention to provide an information recording device which employs a recording medium comprising a plurality of photosensitive layers to thereby enable guide sections to be formed upon application of light beams on the recording medium.

It is yet another object of the present invention to provide an information recording device which employs a recording medium comprising two photosensitive layers, one of which may be used to record information signals and the other may be used to form guide sections.

It is also an object of the present invention to provide an information recording device which employs a recording medium comprising two photosensitive layers of different photosensitivities and a floating element having a lens thereon, and in which the recording medium may be rapidly rotated to thereby keep the floating element a predetermined distance apart from the recording medium so that the recording medium may be irradiated with a steady light beam and a modulated light beam through the lens on the floating element, thus recording information on the recording medium.

BRIEF DESCRIPTION OF THE DRAWINGS

The invention will become more fully apparent from the following detailed description thereof taken in conjunction with the accompanying drawings, in which.

DESCRIPTION OF THE PREFERRED EMBODIMENTS

Figure 1:
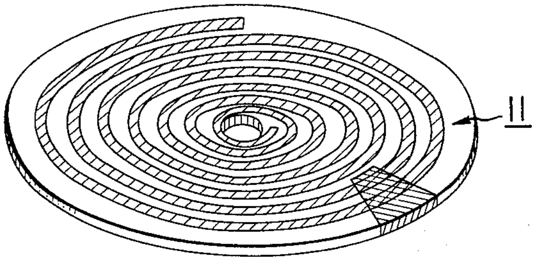
FIG. 1 is a perspective view of a disc-like recording medium as it is spirally irradiated and scanned with light beams.
Figure 2:
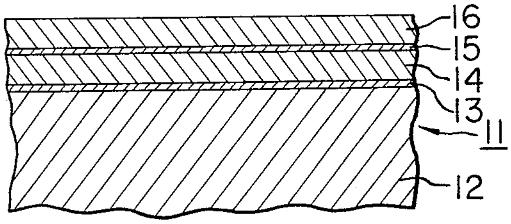
FIG. 2 is a vertical section of the recording medium applicable to the present invention.

Referring to FIG. 1, an information recording medium applicable to the present invention is shown in perspective view and generally designated by 11. Such recording medium, as is shown in FIG. 2, comprises a substrate 12 of glass or like material, a first metallic film layer 13, a layer 14 of high-sensitivity chalcogen glass which is a first photosensitive material, a second metallic film layer 15, and a layer 16 of low-sensitivity chalcogen glass which is a second photosensitive material, these layers being superposed one upon another in the named order.

The chalcogen glass is a non-crystalline solid (vitreous) compound of sulfur elements. By preparing an laminate of such glass film and a metallic film which may typically be a metal such as Ag, Zn, Cd, Mn, Ga, Mi, Cr, In, Cu, Bi or Te and by exposing the laminate of metal and chalcogen glass to light, the metal will diffuse into the chalcogen glass in the region of the laminate which has been exposed to light. It is known that such region in which the metal has diffused into the chalcogen glass has insolubility to alkali.

The recording medium so constructed may be irradiated with an information beam for recording information signals and guide beams for forming guide sections while the beams and the recording medium are being moved relative to each other so that the beams depict spiral scanning paths. (Actually, it is preferable for the scanning to be effected in such a manner that adjacent scanning paths of the beams are in contact or overlapped relationship with each other, but for simplicity adjacent paths are shown in non-contact relationship in FIG. 1.)

Figure 3:
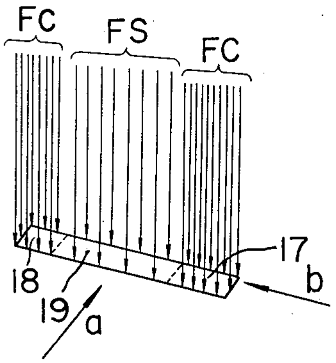
FIG. 3 is a perspective view showing one form of the beams for scanning the recording medium.

Such beams are particularly shown in FIG. 3, wherein the opposite end portions 17 and 18 are occupied by guide forming beams FC of rectangular cross-section and having a predetermined intensity sufficient to sensitize the low-sensitivity photosensitive layer 16 of the recording medium and the center portion 19 is occupied by a picture beam portion FS digitally modulated by information signals so as to provide an intensity sufficient to sensitize only the high-sensitivity photosensitive layer 14 of the recording medium but insufficient to sensitize the said low-sensitivity photosensitive layer 16 (i.e. a beam portion adapted to flicker in accordance with the information signals.

Figure 4:
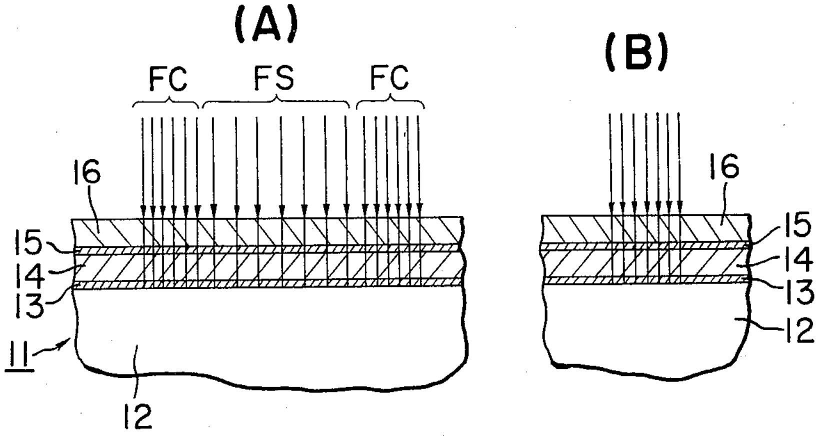
FIGS. 4A and B are views taken along arrows *a* and *b* in FIG. 3 and illustrating the beams as they irradiate the recording medium.

FIGS. 4A and B show the cross-sections of the recording medium taken along arrows *a* and *b* in FIG. 3 as it is irradiated with the beam of rectangular cross-section as shown in FIG. 3. Accordingly, it is possible to record the information signals and the guide sections on the recording medium by causing the beam to scan spirally of the recording medium with the long sides thereof in accord with the radial direction of the latter and by modulating the information beam portion FS by the information signal.

Figure 5:
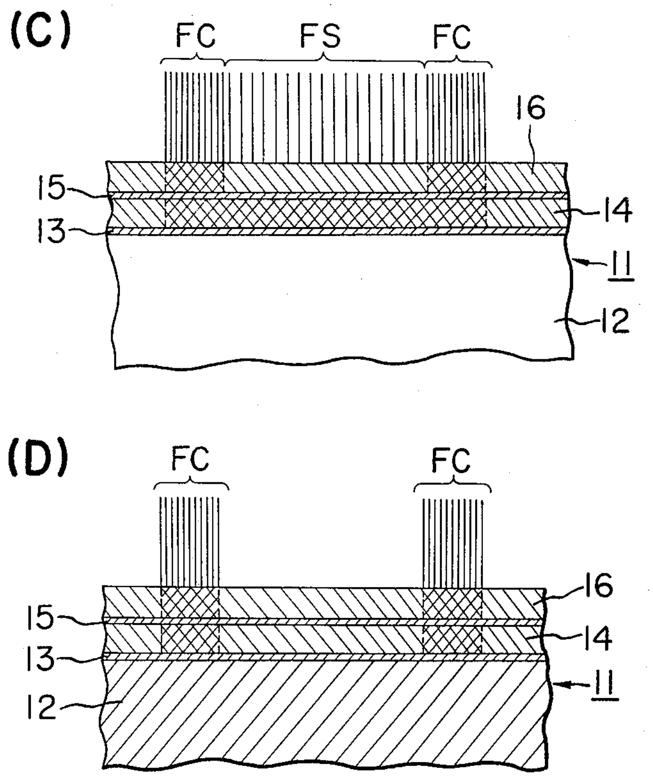
FIGS. 5C and D are vertical sections of the recording medium as it is exposed to a light beam modulated by information signals, FIG. 5C showing the case where the modulation is effected so that the light beam may be present while FIG. 5D showing the case where the modulation is effected so that the light beam may be absent.

FIGS. 5C and D show cross-sections of the recording medium taken along the radius thereof and illustrate the responsive condition of the recording medium when the beam is modulated by information signals to provide a certain intensity and when the beam has no beam component, respectively. When irradiated with the guide beams FC, the photosensitive layers 14 and 16 are both responsive to the beam as indicated by the cross-shaded regions, so that the low-sensitivity and high-sensitivity glasses forming these layers permit diffusion of the metal thereinto to make those regions insoluble to alkali. On the other hand, the picture beam FS is lower in intensity than the guide beams, and therefore, as shown in FIG. 5C, the low-sensitivity photosensitive layer 16 formed of low-sensitivity chalcogen glass is not responsive to the picture beam FS when no information beam is present, whereas only the high-sensitivity photosensitive layer 14 formed of high-sensitivity chalcogen glass is responsive to the beam as indicated by the cross-shaded regions, and the regions so sensitized become insoluble to alkali. It is to be noted that the photosensitive layers 14, 16 of chalcogen glasses and the metallic layers 13, 15 are all so thin as to permit passage of light therethrough and accordingly, any and every layer may be readily irradiated. When the beam has been modulated by information signals to nullify the picture beam FS, only the regions of the recording medium which are irradiated with the guide beam components FC will be responsive to the beam, as indicated by cross-shaded regions in FIG. 5D, and thus become insoluble to alkali.

Figure 6:
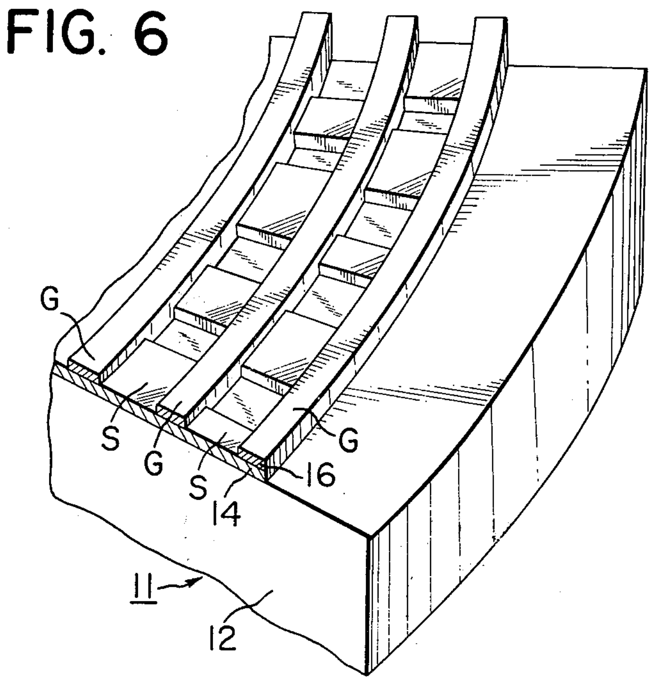
FIG. 6 is a fragmentary perspective of a recording medium whose unexposed regions have been removed by a treatment after the recording medium has been spirally scanned by a light beam modulated by signals and a steady light beam.

By spirally scanning the recording medium with the guide and information beams in the described manner and thereafter treating the recording medium with alkaline liquid to remove the unexposed portions of the photosensitive layers, there are provided guide sections G projectedly on the opposite sides of each information recording section S, in the manner as shown in FIG. 6, which is a perspective view showing the wedge-shaped portions indicated by hatching in FIG. 1. FIG. 6 shows the information recording sections S and the guide sections G to a much greater scale then they really are, and also shows an example in which scanning has been effected without any gap being produced between adjacent guide beams during the spiral formation of the beam paths.

In the above-described embodiment, the metallic film layers 13 and 15 have been interposed between the substrate 12 and the chalcogen layer 14 and between the chalcogen layers 14 and 16, respectively, whereas it is possible either to employ only a single metallic film layer 15 or to provide a further metallic film layer over the chalcogen glass layer 16 in addition to the arrangement shown in FIG. 2.

Figure 13:
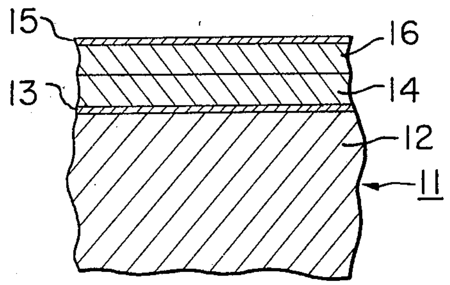
FIG. 13 is a sectional view showing a further form of the recording medium.

In such a recording medium, it is also possible to dispose the metallic layer 15 over the low-sensitivity chalcogen glass 16 in the manner as shown in FIG. 13, in which case the diffusion of the metal into the chalcogen glasses 14 and 16 can take place uniformly.

Figure 7:
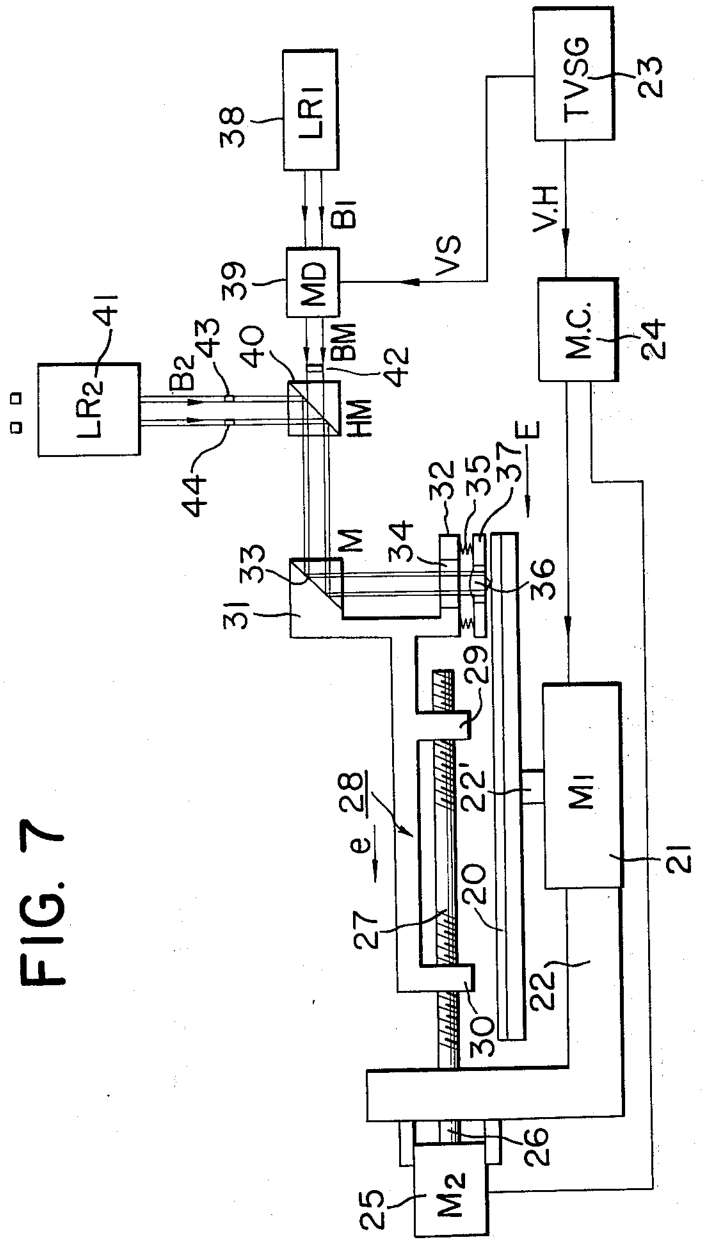
FIG. 7 diagrammatically illustrates the information recording device according to the present invention.
Figure 8:
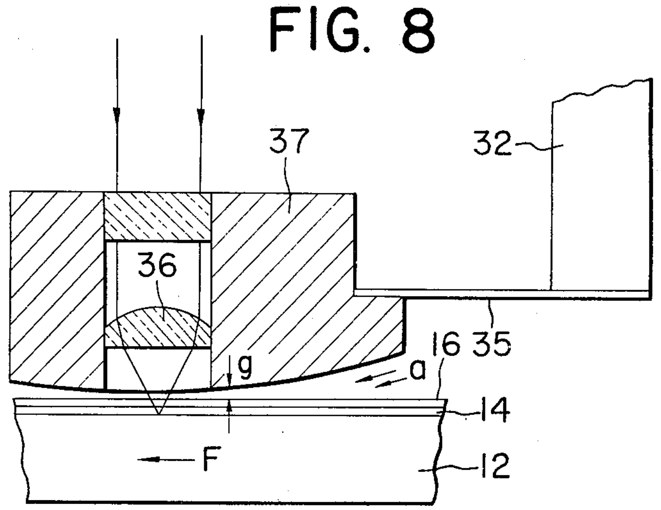
FIG. 8 is a fragmentary view illustrating the floating element and associated portions shown in FIG. 7.

With reference to FIGS. 7 and 8, description will now be made of the means for spirally scanning the recording medium with a beam and of a beam control system. In FIG. 7, reference numeral 20 designates a turn table connected to a rotary shaft 21' of a motor 21 secured to a frame 22. A recording medium 11 of such configuration as shown in FIG. 1 is securely carried on the turn table 20 by unshown means so that it is rotatable with the turn table.

Designated by numeral 23 is a VTR output unit which is a signal source, from which synchronized signals such as vertical and horizontal signals are delivered to a drive circuit 24, which in turn generates a current for energizing the motor 21 and another motor 25 (to be described) to drive the recording medium at the same speed as that of the television frame.

The motor 25 is secured to the frame 22 and its shaft 26 has a feed screw 27 connected thereto and adapted to rotate in response to the signals from the drive circuit 24. A carrier member 28 is in mesh engagement with the feed screw 27 at mating portions 29 and 30 for movement in the direction of arrow *e* with the rotation of the feed screw. One end of the carrier member 27 is divided into two branches forming holder portions 31 and 32. The holder portion 31 securely holds a mirror 33 thereon, and the holder portions 32 has an opening 34 formed therethrough and carries a floating member 37 by means of spring member 35 attached to the marginal portion of the opening 34, the floating member 37 holding a lens 36 therein.

A video signal recording laser source 38 is provided to produce a laser beam such as B1, which may be applied to a modulator 39 which modulates a video signal VS from the VTR output unit 23. The modulated beam such as BM may be applied to a half-mirror prism 40. A second laser source 41 is provided to form guide sections for guiding an information signal detector (not shown). A beam B2 from such second laser source 41 may be applied to the half-mirror 40. In order that these two beams may be thrown upon the recording medium in the manner as shown in FIG. 3, the beam BM from the modulator 39 presents on the half-mirror prism a cross-section, as indicated at 42, corresponding in shape to the central portion 19 of FIG. 3, the beam B2 from the laser source 41 presents on the half-mirror prism cross-sections, as indicated at 43 and 44, corresponding in shape to the opposite end portions 17 and 18 of FIG. 3, and the two beams B2 and BM on the half-mirror prism have a relation similar to that of the beams FC and FS shown in FIG. 3.

The beam BM passed through the half-mirror prism 40 and the beam B2 reflected by the half-mirror prism 40 are both reflected by the mirror 33 and then passed through the opening 34 in the holder portion 32 and through the lens 36 in the floating member 37 until the beams are finally focused on the recording medium 11. The beams impinging on the recording medium 11 are as shown in FIG. 3, that is, their longer sides are in accord with the radial direction of the recording medium 11.

FIG. 8 shows an enlarged view of the holder portion 32 of the carrier member 28 as seen in the direction of arrow E in FIG. 7. The floating member 37 is carried on the holder portion 32 by means of the spring 35 (which is herein shown schematically as a plate spring for the purpose of illustration). The floating member 37, like the known one used with the conventional floating magnetic head, has its bottom surface formed arcuate with respect to the rotational direction F of the recording medium 11, and the resiliency of the spring 35 and the curvature of the bottom surface of the floating member 37 are selected such that, when the recording medium 11 is being rotated by the motor 21, the bloating member receives a buoyancy from an air stream produced along the bottom surface thereof to thereby form a predetermined gap *g* between the recording medium 11 and the bottom surface of the floating member 37. However, since the wavelength of the video signal is at a small value of the order of several microns, the laser beam BM must be focused in the form of an extremely slim slit on the surface of the recording medium and accordingly, the gap *g* must be minimized in fluctuation. For example, a lens 36 of short focal distance and small relative aperture is required to provide an image having a width of the order of 0.5 micron, and in such a case, the depth of focus of the lens is so small that the distance *g* between the lens and the surface of the recording medium is actually at an allowable value of the order of 0.3 micron. The floating member 37 makes it possible to limit the fluctuation of the gap *g* within the said range.

Therefore, as the motor 21 is energized to rotate the recording medium at a high speed while the motor 25 is energized to move the carrier member 28 in the direction of arrow *e*, the spiral scanning paths as shown in FIG. 1 may be formed on the recording medium 11.

The carrier member 28 is movable in response to the rotation of the motor 25, but since the information carried by the beams from the half-mirror prism 40 is delivered to the mirror 33, it is possible to fixedly mount the light sources 38, 41, VTR output unit 23, drive circuit 24, modulator 39 and half-mirror prism 40.

In FIG. 1, the beam's scanning paths have been shown to an enlarged scale for the purpose of illustration, whereas actually the scanning paths are formed at a very high density, say, 100 lines per millimeter.

Although the above-described embodiment has been described as employing a photosensitive medium of chalcogen glass whose exposed portion is fixed and whose unexposed portion is removed, by a post-treatment, the present invention may equally be carried out by using a photosensitive medium whose exposed portion is removed and whose unexposed portion is fixed, by a post-treatment.

Figure 9:
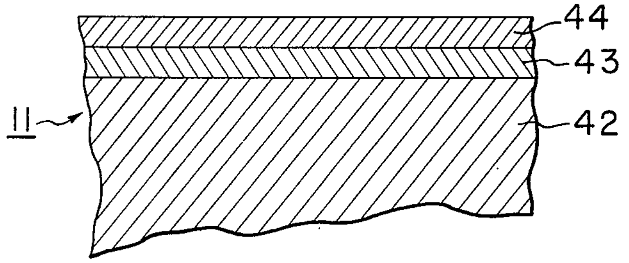
FIG. 9 shows, in cross-section, another form of the recording medium.
Figure 10:
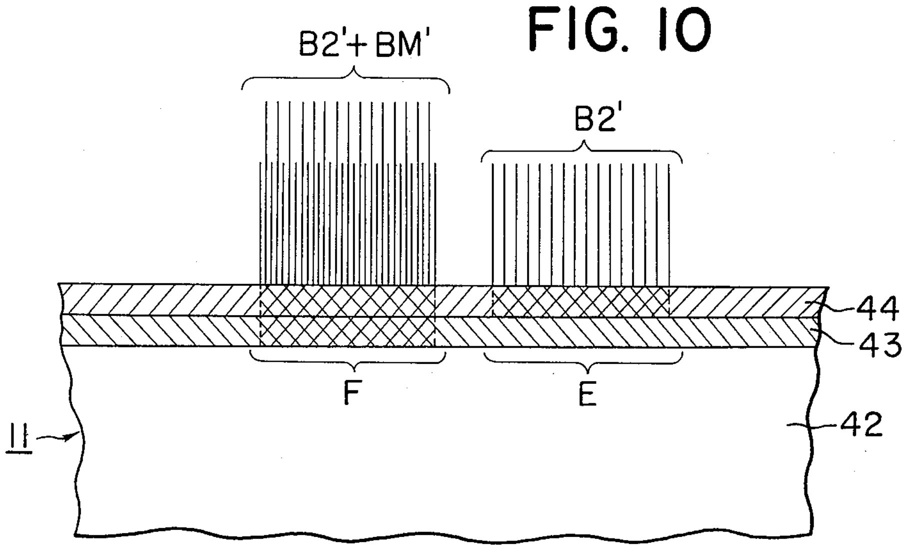
FIG. 10 illustrates the manner in which the recording medium of FIG. 9 is exposed to light when irradiated with light beams, wherein E indicates the case where a steady light beam alone is thrown and F the case where both the steady light beam and a modulated light beam are present.

FIG. 9 shows, in cross-section, a recording medium 11 comprising such an alternative photosensitive medium. In this figure, reference numeral 42 designates a substrate of glass or like material having as good a surface property as that of the substrate 12 in FIG. 1. A relatively low-sensitivity photoresist layer 43 overlies the substrate, and is followed by a relatively high-sensitivity photoresist layer 44. Thus, when the recording medium 11 is irradiated with a light having a beam intensity of a predetermined value or higher, both photoresist layers 43 and 44 will be responsive to the light in the manner as shown by F in FIG. 10. Conversely, when the recording medium is irradiated with a light having a beam intensity lower than the predetermined value, the photoresist layer 44 alone will be responsive to such light in the manner as shown by E in FIG. 10. In the photoresist layers, the sensitized portions may be removed by the known alkali treatment as described previously. Therefore, by keeping on application of a beam B2' having a sufficient intensity to which the photoresist layer 44 is responsive, and by superposing on such beam a beam BM' modulated by the picture information, and further by making such a design that the photoresist layer 43 is also responsive to the beam when the beam BM' is present, a recording medium having guide sections and recording sections as shown in FIG. 6 may be provided.

Figure 11:
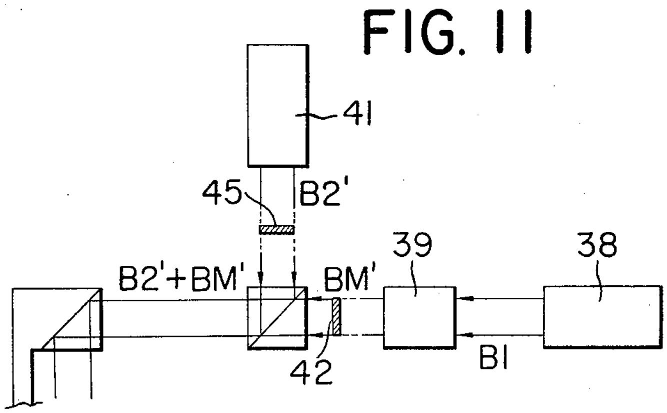
FIG. 11 is a diagram showing the paths of the beams in the information recording device using the recording medium as shown in FIG. 9.
Figure 12:
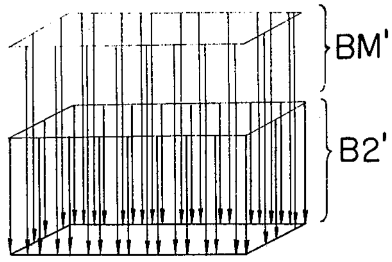
FIG. 12 illustrates the light beams for irradiating the recording medium as shown in FIG. 9.

In order to obtain the beams B2' and BM', the cross-sectional shape of the beam from the second laser source 41 in FIG. 7 may be somewhat changed in the manner as shown in FIG. 11. More specifically, the cross-section on the half-mirror prism 40 of the beam B2' passing from the second laser source 41 to that prism may be formed into the same shape as that of the beam imparted from the modulator 39 to the half-mirror prism 40 and the two beams may be caused to be integral with each other on the half-mirror prism, whereby the beams B2' and BM' may be obtained which irradiate the recording medium at the same area thereof in the manner as shown in FIG. 12.

The beam B2' from the second laser source is effective only to the photoresist layer 44 and the sum of the beam BM' from the first laser source and the beam B2' is effective to both photoresist layers 44 and 43.

Accordingly, as already described with respect to FIG. 7, by modulating the modulator 39 in accordance with the television signal VS, causing the beam BM' to exist and extinguish alternately, scanning the recording medium spirally in such a manner that adjacent scanning paths are not in contact with each other, and treating the recording medium to remove the sensitized portions of the photosensitive layers, the photoresist layers 44 and 43 will result in the guide sections and recording sections so configured as shown in FIG. 6.

The recording medium thus provided and having the configuration as shown in FIG. 6 may be used to produce a press prototype, which in turn may be utilized to provide a mass production of duplicates in a manner similar to the production of conventional audio records. The duplicate records thus produced may have the guide and recording sections either similar or opposite in concavityconvexity to the original recording medium, but in either case the guide sections can guide a reproducing detector along the recording sections.

I claim:

1. In an information recording device for forming an information recording portion and a guide portion on a recording medium having a beam-sensitive member by scanning with a beam modulated by recording signals and a steady beam having a constant intensity, said beams being emitted from beam source means; said recording medium comprising a substrate, a first beam-sensitive layer on said substrate, said first layer having a sensitivity to a beam of an intensity over a predetermined value, and a second beam-sensitive layer on said first beam-sensitive layer, said second layer having a sensitivity to a beam of an intensity different from that of said first layer, and one of said beam-sensitive layers being sensitive to one of said beams and said first and second layers being sensitive to the other beam, thereby to form said guide portion across said first and second beam-sensitive layers while forming said information recording portion in one of said beam-sensitive layers.

2. An information recording device according to claim 1, wherein said first and second beam-sensitive layers are formed of metal chalcogen glasses.

3. An information recording device according to claim 2, wherein a metallic film layer is interposed between said first beam-sensitive layer and said substrate and a metallic film layer is provided over said second beam-sensitive layer.

4. In an information recording device for forming an information recording portion and a guide portions on a recording medium having a beam-sensitive member by scanning with a beam modulated by recording signals and a steady beam having a constant intensity, said beams being emitted from beam source means; said recording medium comprising a substrate on which is provided a layer of low sensitivity and a layer of high sensitivity, said layer of low sensitivity being sensitive to a beam of intensity not less than a predetermined value, and said layer of high sensitivity being sensitive to a beam of intensity not more than said predetermined value; said steady beam having an intensity sufficient to activate said two layers and said modulated beam having an intensity sufficient to activate only the layer of high sensitivity.

5. An information recording device according to claim 4, wherein said device comprises means for radiating said steady beam adjacent to said modulated beam onto said recording medium.

6. An information recording device according to claim 5, wherein said layer of high sensitivity is disposed on said substrate and said layer of low sensitivity is disposed on said layer of high sensitivity.

7. An information recording device comprising:

beam generating means including means for generating a beam modulated with recording signals and means for generating a beam of a steady intensity greater than that of the modulated beam;

a rotary recording medium including a substrate, said recording medium comprising a substrate, a first beam-sensitive layer on said substrate, said first layer having a sensitivity to a beam of an intensity over a predetermined value, and a second beam-sensitive layer on said first beam-sensitive layer, said second layer having a sensitivity to a beam of an intensity different from that of said first layer, and one of said beam-sensitive layers being sensitive to one of said beams and said first and second layers being sensitive to the other beam, thereby to form said guide portion across said first and second beam-sensitive layers while form said information recording portion in one of said beam-sensitive layers;

means for radiating said steady beam and said modulated beam adjacent each other onto said rotary recording medium;

means for rotating said rotary recording medium; and means for shifting said steady and modulated beams radially of said rotary recording medium.

8. An information recording device comprising:

a recording medium including a substrate, a first photosensitive layer having a certain sensitivity overlaid on said substrate and a second photosensitive layer having a sensitivity higher than that of said first layer overlaid on said first layer;

means for rotating said recording medium;

means for generating a steady light beam having a light intensity sufficient to sensitize said second photosensitive layer;

means for generating a modulated light beam modulated by recording signals and having a light intensity sufficient to sensitize both of said photosensitive layers when radiated onto said recording medium together with said steady light beam;

means for directing said steady light and said modulated light beams to radiate on a common portion of said recording medium; and means for shifting said steady light and said modulated light beams radially of said recording medium.

9. A recording device comprising:

beam generating means including means for generating a beam of a steady intensity and means for generating a beam modulated with recording signals, said modulated beam being of an intensity greater than that of the modulated beam;

said recording medium comprising a substrate, a first beam-sensitive layer on said substrate, said first layer having a sensitivity to a beam of an intensity over a predetermined value, and a second beam-sensitive layer on said first beam-sensitive layer, said second layer having a sensitivity to a beam of an intensity different from that of said first layer, and one of said beam-sensitive layers being sensitive to one of said beams and said first and second layers being sensitive to the other beam, thereby to form said guide portion across said first and second beam-sensitive layers while forming said information recording portion in one of said beam-sensitive layers;

means for radiating said modulated beam and said steady beam onto a common portion of said recording medium; and means for moving said recording medium.

10. An information recording device comprising:

beam generating means including means for generating a beam of a steady intensity and means for generating a beam modulated with signals to be recorded, said modulated beam being of an intensity greater than that of the modulated beam;

said recording medium comprising a substrate, a first beam-sensitive layer on said substrate, said first layer having a sensitivity to a beam of an intensity over a predetermined value, and a second beam-sensitive layer on said first beam-sensitive layer, said second layer having a sensitivity to a beam of an intensity different from that of said first layer, and one of said beam-sensitive layers being sensitive to one of said beams and said first and second layers being sensitive to the other beam, thereby to form said guide portion across said first and second beam-sensitive layers while forming said information recording portion in one of said beam-sensitive layers;

means for radiating said modulated beam and said steady beam onto a common portion of said recording medium; and means for shifting said steady beam and said modulated beam radially of said recording medium.

* * * * *